United States Patent [19]

Yamamuro et al.

[11] Patent Number: 4,510,822

[45] Date of Patent: Apr. 16, 1985

[54] CONTINUOUSLY VARIABLE V-BELT TRANSMISSION INCLUDING HYDRODYNAMIC TRANSMISSION UNIT WITH LOCK-UP MEANS

[75] Inventors: Sigeaki Yamamuro, Zushi; Hiroyuki Hirano; Yoshiro Morimoto, both of Yokosuka; Yoshikazu Tanaka, Yokohama, all of Japan

[73] Assignee: Nissan Motor Company, Limited, Yokohama, Japan

[21] Appl. No.: 362,491

[22] Filed: Mar. 26, 1982

[30] Foreign Application Priority Data

Mar. 28, 1981 [JP] Japan .................. 56-44746
Mar. 28, 1981 [JP] Japan .................. 56-44751

[51] Int. Cl.³ .............. F16H 47/00; F16H 55/52; F16D 33/00; F16D 35/00
[52] U.S. Cl. ........................ 74/733; 74/731; 474/11; 474/28; 474/70; 192/3.31; 192/3.33; 192/3.57
[58] Field of Search .......... 74/730, 731, 689, 867, 74/868, 732, 733; 474/11, 17, 18, 28, 70; 192/3.28, 3.29, 3.31, 3.32, 3.33, 3.57, 103 R, 87.14, 48.9, 303

[56] References Cited

U.S. PATENT DOCUMENTS

| | | | |
|---|---|---|---|
| 3,451,283 | 6/1969 | Rattunde | 474/18 |
| 3,526,305 | 9/1970 | August | 74/732 X |
| 3,949,847 | 4/1976 | Hoehn | 192/3.3 |
| 4,099,603 | 7/1978 | Peppel | 192/3.31 |
| 4,125,037 | 11/1978 | Palmer et al. | 474/28 X |
| 4,176,564 | 12/1979 | Ahlen et al. | 74/732 |
| 4,270,636 | 6/1981 | Sunohara et al. | 74/731 X |
| 4,274,520 | 6/1981 | Van der Hardt Aberson | 192/3.57 |

Primary Examiner—Allan D. Herrmann
Assistant Examiner—Stephen B. Andrews
Attorney, Agent, or Firm—Schwartz, Jeffery, Schwaab, Mack, Blumenthal & Koch

[57] ABSTRACT

A continuously variable V-belt transmission comprises a hydrodynamic transmission unit including a lock-up means. A switch valve is provided which is responsive to fluid pressure in a cylinder chamber of a drive pulley, which fluid pressure being indicative of the reduction ratio of a continuously variable V-belt transmission unit. The lock-up means is engaged in response to the state of the switch valve to lock the hydrodynamic transmission unit when the reduction ratio is small. The switch valve may be responsive to stator reaction of a stator of the hydrodynamic transmission unit so that the lock-up means is released as long as the hydrodynamic transmission unit multiply torque.

10 Claims, 9 Drawing Figures

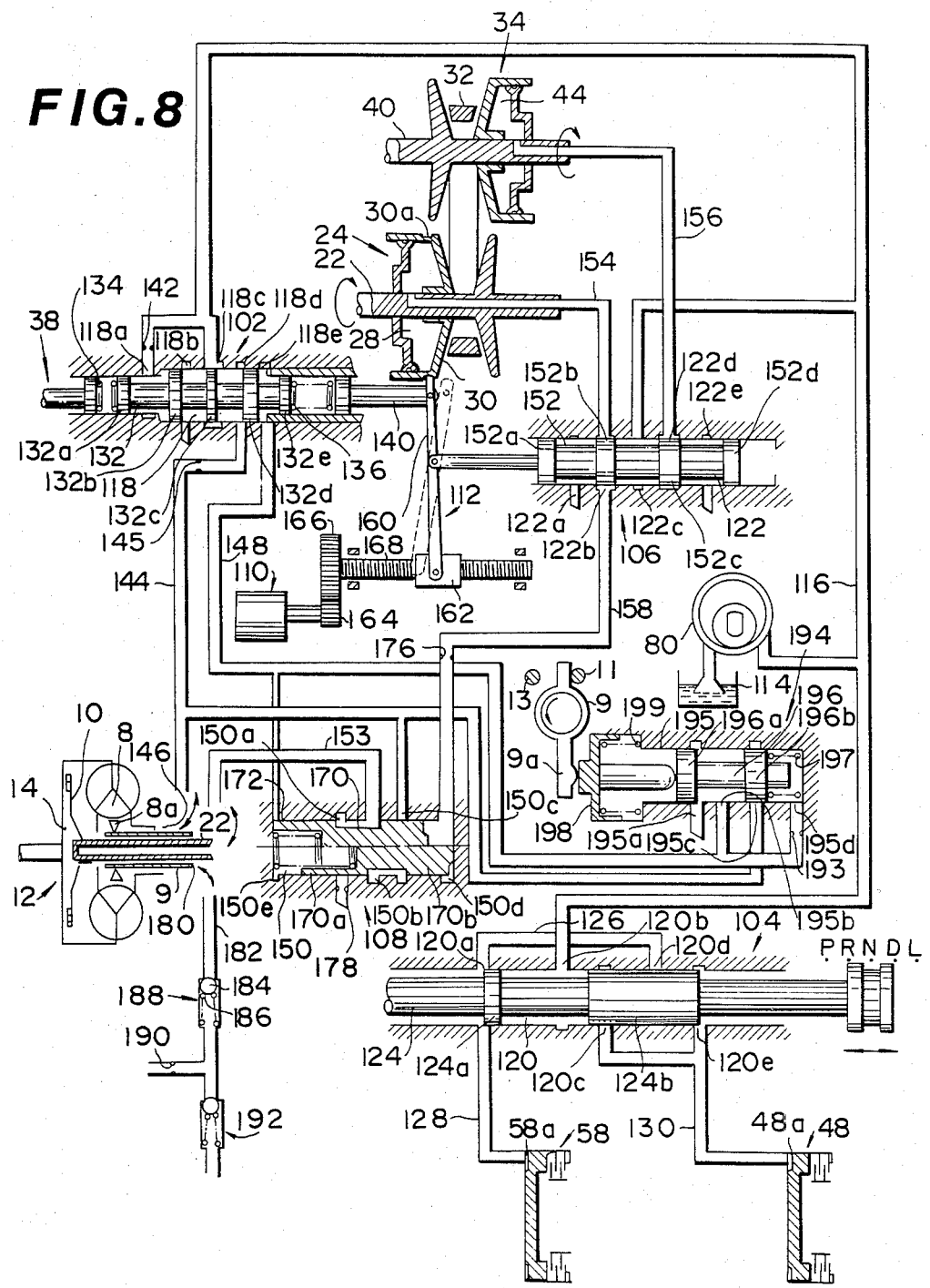

CONTINUOUSLY VARIABLE V-BELT TRANSMISSION INCLUDING HYDRODYNAMIC TRANSMISSION UNIT WITH LOCK-UP MEANS

BACKGROUND OF THE INVENTION

1. Field of the Invention

The present invention relates to a continuously variable V-belt transmission including hydrodynamic transmission unit with a lock-up means, and more particularly to a lock-up control for the hydrodynamic transmission unit.

2. Description of the Prior Art

A conventional continuously variable V-belt transmission is disclosed in laid-open Japanese patent application No. Sho 55-60755 which corresponds to U.S. Pat. No. 4,274,520 and is illustrated in FIG. 1. This continuously variable transmission comprises a fluid coupling 201 with a lock-up device in the form of a multiple disc clutch disposed within the fluid coupling, a drive pulley 205 including a fixed cone conical disc 203 and a movable conical disc 204, and a V-belt 206 interconnecting a driven pulley (not illustrated) and drive pulley 205, wherein output from a turbine runner 201a of the fluid coupling 201 is delivered to the drive pulley 205 and then to the driven pulley via the V-belt 206. For accomplishing a continuously variable ratio change, the radius of the diameter of the drive pulley 205 contacting with the V-belt 206 is changed by urging the movable conical disc 204 in an axial direction. The movement of the movable conical disc 204 is accomplished by the oil pressure acting within the pulley cylinder chamber 207 and the amount of movement is determined by the magnitude of the oil pressure therein. When the lock-up device is actuated by applying oil pressure to the cylinder chamber 208 to press the piston 209, the pump impeller 201b of the fluid coupling 201 is mechanically connected with the drive pulley 205, thus allowing the fluid coupling to stop operating as a fluid coupling. The pulley cylinder chamber 207 of the drive pulley 205 and a cylinder chamber 208 of the lock-up device 202 are communicated with each other so that they receive common oil pressure from an oil conduit 210. Accordingly, when the oil pressure within the oil conduit 210 is low, a transmission ratio shifts toward a low side (viz., a side wherein a reduction ratio is great) and the lock-up device 202 is left unactuated so that the fluid coupling resumes its function as a fluid coupling. Conversely, when the oil pressure within the oil conduit 210 increases, the transmission ratio shifts to a high side (viz., a side wherein the reduction ratio is small) and the lock-up device is actuated to allow the fluid coupling 201 to operate in a lock-up state (engaged state).

However, since, in such a conventional continuously variable transmission, the oil pressure supplied to the pulley cylinder chamber 207 of the drive pulley 205 is the same as that supplied to the cylinder chamber 208 of the lock-up device 202 and this oil pressure is variable to provide a variable reduction ratio, there is a problem that since, when the oil pressure is low, the oil pressure within the cylinder chamber 208 of the lock-up device is accordingly low, the multiple disc clutch may be kept in half engaged state, accelerating the rate of wear of the clutch discs or causing a damage on the discs, while, when the oil pressure is high (viz., when the reduction ratio is small), a great force is impressed upon the multiple friction discs, thus breaking them off.

SUMMARY OF THE INVENTION

With a control according to the present invention, a lock-up means is operative when engaged to lock a hydrodynamic transmission unit in a lock-up mode. The lock-up means is controlled by a switch valve means which in shiftable into one of two available states in response to fluid pressure in a cylinder chamber of a drive pulley, which fluid pressure is indicative of the reduction ratio of the hydrodynamic transmission unit.

Preferably, the switch valve is responsive also to stator reaction of a stator of the hydrodynamic transmission unit to detect a torque multiplication state of the hydrodynamic transmission unit so as to prevent the lock-up means from locking the hydrodynamic transmission unit.

An object of the present invention is to provide a lock-up control which although responsive to the reduction ratio of a continuously variable V-belt transmission unit is free from the above-mentioned problem.

BRIEF DESCRIPTION OF THE DRAWINGS

The present invention is more specifically described in connection with the accompanying drawings, wherein:

FIG. 8 illustrates a third embodiment; and

DETAILED DESCRIPTION OF THE INVENTION

Referring to the accompanying drawings, the first embodiment is described hereinafter along with FIGS. 2 through 5.

Figure 2:
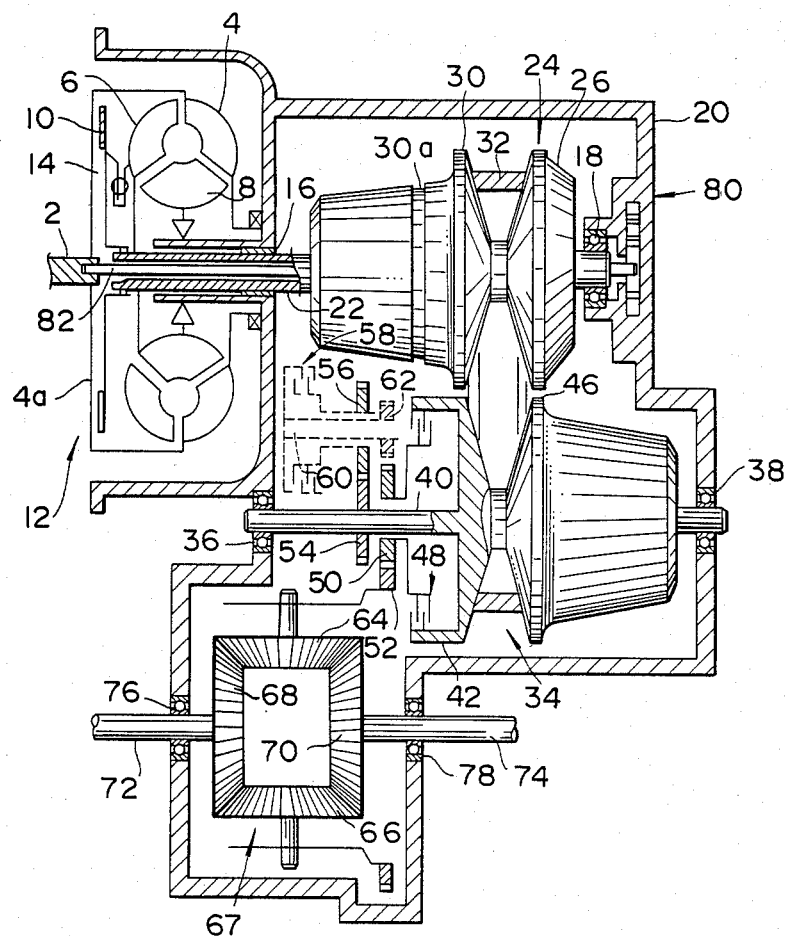
FIG. 2 is a diagrammatic view illustrating a power transmission mechanism of a continuously variable transmission.
Figure 3:
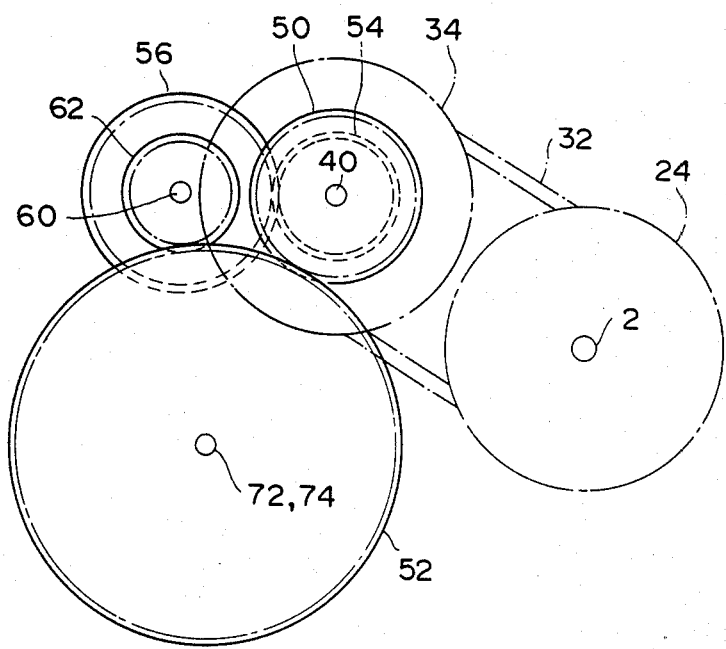
FIG. 3 is a layout of the shafts used in the continuously variable transmission shown in FIG. 2.

As shown in FIG. 2, a continuously variable V-belt transmission includes a hydrodynamic transmission unit 12 having an output drivingly connected to a drive shaft 22 of continuously variable V-belt transmission unit 24. The hydrodynamic transmission unit 12 is in the form of a torque converter although it may be in the form of a fluid coupling. The torque converter 12 includes a pump impeller 4 connected to an engine output shaft 2 rotatable with a crankshaft of the engine (not illustrated), a turbine runner 6 and a stator 8 carried by a reaction shaft 9 via a one-way clutch 8a. The torque converter 12 includes a lock-up means or a lock-up clutch 10 which is operative when engaged to lock the torque converter 12 in a lock-up mode wherein the turbine runner 6 is directly connected to the pump impeller 4. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14 and operates such that when the oil pressure within the lock-up clutch oil chamber 14 becomes lower than that within the interior of the torque converter 12, this difference in oil pressure urges the lock-up clutch 10 to be pressed against the member 4a to come into a unitary rotation therewith. The turbine runner 6 is splined to one end of the drive shaft 22 which is rotatably supported by a case 20 via bearings 16 and 18. Arranged on the drive shaft 22 between the bearings 16 and 18 is a drive pulley 24.

Figure 4:
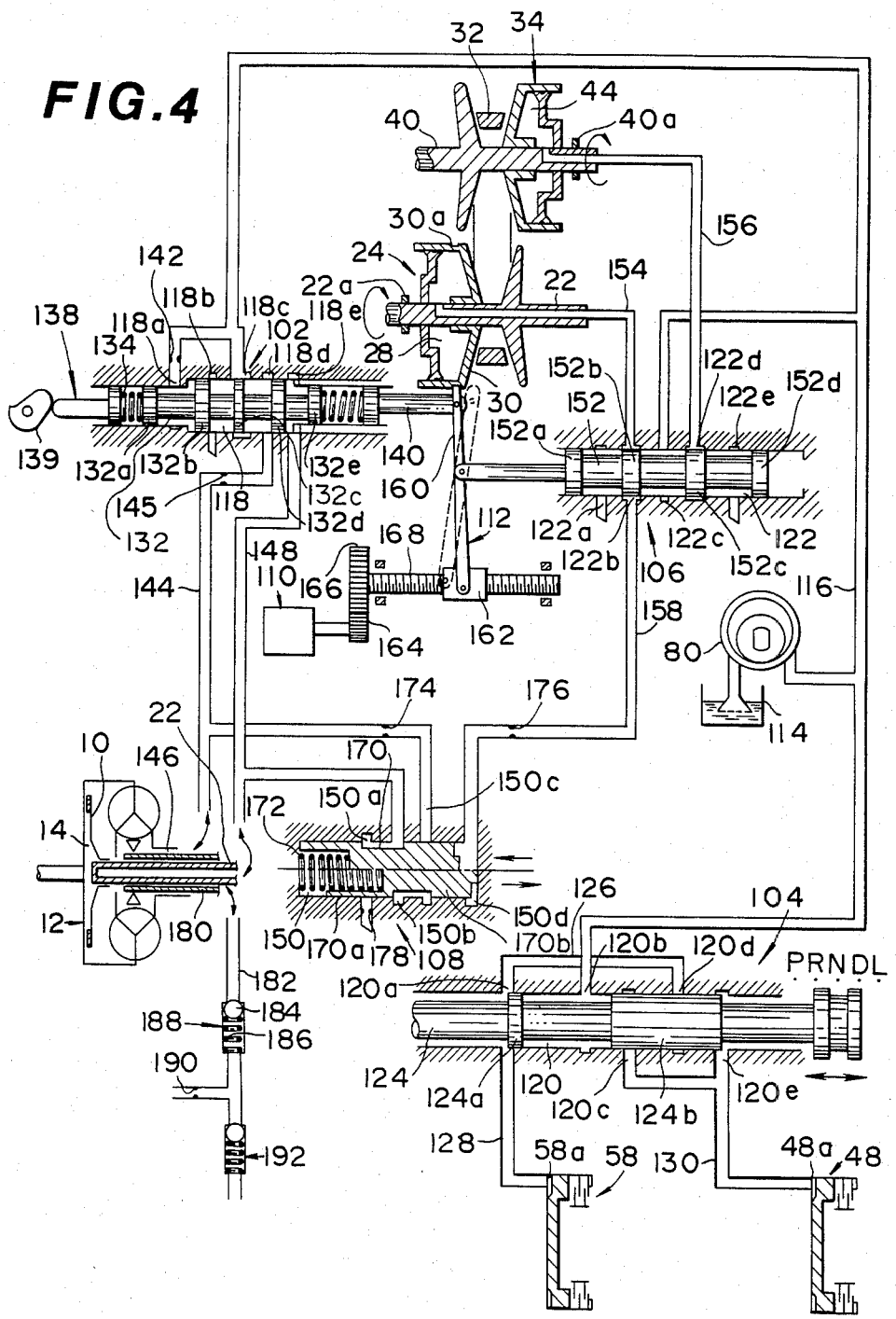
FIG. 4 is a hydraulic control system for the power transmission mechanism shown in FIG. 2 and illustrates a first embodiment.

The drive pulley 24 comprises an axially fixed conical disc 26 and an axially movable conical disc 30 which is disposed to face the axially fixed conical disc 26 to define a V-shaped pulley groove therebetween and which is allowed to slide in an axial direction of the driven shaft 22 in response to an oil pressure created within a drive pulley cylinder chamber 28 (see FIG. 4). The drive pulley 24 is drivingly connected to a driven pulley 34 via a V-belt 32, this driven pully 34 being arranged on a driven shaft 40 which is rotatably supported by the case 20 via the bearings 36 and 38. The driven pulley 34 comprises an axially fixed conical disc 42 fixed to the driven shaft 40 and an axially movable conical disc 46 which is disposed to face the fixed conical disc 42 in such a manner as to define a V-shaped pulley groove and which is allowed to slide in an axial direction of the driven shaft 40 in response to an oil pressure created in a driven pulley cylinder chamber 44 (FIG 4).

The axially fixed conical disc 42 is drivingly connectable via a forward drive multiple disc clutch 48 to a forward drive gear 50 rotatably supported on the driven shaft 40, this forward drive gear being in mesh with a ring gear 52. Fixed to the driven shaft 40 is a reverse drive gear 54 which is in mesh with an idler gear 56. The idle gear 56 is drivingly connectable via a reverse drive multiple disc clutch 58 to an idle shaft 60 which has fixed thereto another idle gear 62 that is in mesh with the ring gear 52. (Although in FIG. 2 the idle gear 62, idle shaft 60 and reverse drive multiple disc clutch 58 are illustrated in positions displaced from the actually positions thereof for ease of illustration, the idler gear 62 and ring gear 52 are shown as out of mesh with each other, but, they are actually in mesh with each other as will be understood from FIG. 3.) The ring gear 52 has attached thereto a pair of pinion gears 64 and 66, output shafts 72 and 74 being coupled with side gears 68 and 70, respectively, which are in mesh with the pinion gears 64 and 66 to cooperate to form a differential 67, and the output shafts 72 and 74 which are supported via bearings 76 and 78, respectively, extending outwardly of the case 20 in the opposite directions. These output shafts 72 and 74 are connected to road wheels (not shown), respectively.

In FIG. 2, there is arranged on the right side of the bearing 18 an oil pump 80 of the internally toothed gearing type which serves as a source of oil pressure, this oil pump 80 being driven by the engine output shaft 2 via an oil pump drive shaft 82 extending through the hollow driven shaft 22. Rotational power fed from the engine output shaft 2 to the continuously variable transmission, viz., a combination of torque converter with lock-up mechanism, continuously variable transmission mechansim and differential, is transmitted via torque converter 12, drive shaft 22, drive pulley 24, V-belt 32, driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 50 and differential 67 to the output shafts 72 and 74 to rotate them in the forward rotational direction, whereas, in the case the reverse drive multiple disc clutch 58 is engaged with the forward drive multiple disc clutch released, the rotation of the shaft 40 is transmitted via the reverse drive gear 54, idle gear 56, idle shaft 60, idle grear 62, ring gear 52 and differential 67 to the output shafts 72 and 74 to rotate them in the reverse rotational direction. During this transmission of power, the rotation ratio between the drive pulley 24 and driven pulley 34 may be varied by moving the axially movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 cause a reduction in radius of the diameter of the drive pulley 24 contacting with the V-belt 32 and an increase in radius of the diameter of the driven pulley 34 contacting with the V-belt 32, resulting in an increase in reduction ratio. If the axially movable conical discs 30 and 46 are moved in the respective reverse directions, a reduction ratio is decreased. Depending upon power transmission circumstances, the torque converter serves as a torque multiplier or serves as a fluid coupling but, since it has the lock-up clutch 10 as attached to the turbine runner 6, the torque converter 12 can establish a direct mechanical connection between the engine output shaft 2 and driven shaft 22 when oil pressure is drained from the lock-up clutch oil chamber 14 to press the lock-up clutch 10 against the member 4a integral with the pump impeller 4.

Referring to FIG. 4, a hydraulic control system for the continuously variable transmission is explained. As shown in FIG. 4, the hydraulic pressure control system comprises an oil pump 80, line pressure regulator valve 102, a manual valve 104, shift ratio control valve 106, lock-up valve 108, shift motor 110, and a shift operating mechanism 112.

The oil pump 80 which is driven by the engine output shaft 2 as mentioned before discharges the oil within the tank 114 into the oil conduit 116. However, the oil pump drive shaft 82 is not illustrated in FIG. 4 for the sake of simplicity of illustration. The oil conduit 116 leads to ports 118a and 118c of the line pressure regulator valve 102 and the oil pressure therein will be regulated into a line pressure. The oil conduit 116 communicates with a port 120b of the manual valve 104 and a port 122c of the control valve 106.

The manual valve 104 has a valve bore 120 provided with five ports 120a, 120b, 120c, 120d and 120e, and a spool 124 formed with two lands 124a and 124b received in the valve bore 120, which spool 124 is actuated by a shift lever (not shown) between five detent positions "P", "R", "N", "D" and "L". The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive line pressure therein. When the spool 124 is set in "P" position, the port 120b supplied with the line pressure is covered by a land 124b, so that the cylinder chamber 58a of the reverse drive multiple disc clutch 58 is drained via the oil conduit 126 and port 120d and the cylinder chamber 48a of the forward drive multiple disc clutch 48 is drained via the port 120e. When the spool 124 is set in "R" position, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in "N" position, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is in "P" position. When the spool 124 is set in "D" or "L" position, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in "P" position or "N" position, both the forward drive multiple disc clutch 48 and reverse drive multiple disc clutch 58 are released to interrupt the transmission of power, thus preventing the rotation of output shafts 72 and 74; when the spool 124 is set in "R" position, the reverse drive multiple disc clutch 58 is engaged so as to drive the output shafts 72 and 74 in the reverse rotational direction; when the spool 124 is set in "D" or "L" position, the forward drive multiple disc clutch 48 is engaged so as to drive the output shafts 72 and 74 in the forward rotational direction. Although there occurs no difference in the respect of a hydraulic circuit between "D" position and "L" position as mentioned above, both of the positions are electrically detected to actuate the shift motor 110 in such a manner as to effect a shift control in accordance with different shift patterns.

The line pressure regulator valve 102 comprises a valve bore 118 provided with five ports 118a, 118b, 118c, 118d and 118e, a spool 132 formed with five lands 132a, 132b, 132c, 132d and 132e, and springs 134 and 136 arranged to the both ends of the spool 132. It is to be noted that the lands 132a and 132e provided on the both end portions of the spool 132 are smaller in diameter than the intermediate lands 132b, 132c, and 132d. The left side spring 134 is disposed between the left end of the spool 132 and a throttle link 138, which throttle link 138 is urged for leftward movement as the throttle opening degree increases or for rightward movement as the throttle opening degree decreases. Therefore, if the throttle opening is great, the force created by the spring 134 urging the spool 132 rightwardly is small, whereas, if the throttle opening degree is small, the force by the spring 134 urging the spool rightwardly is great. A right side spring 136 is disposed between the right end of the spool 132 and a rod 140 cooperating with the axially movable conical disc 30 of the drive pulley 24. Therefore, if the axially movable conical disc 30 of the drive pulley 24 has moved rightwardly (viz., in the case a reduction ratio has decreased), the force by the spring 136 urging the spool 132 leftwardly decreases, whereas, if the axially movable conical disc 30 has moved leftwardly (viz., in the case where the reduction ratio has increased), the force by the spring 136 urging the spool 132 leftwardly increases. As mentioned before, the ports 118a and 118c of the line pressure regulator valve 102 are supplied with the output oil discharged by the oil pump 80, the inlet of the port 118a being provided with an orifice 142. The port 118b is always drained, the port 118d is connected by an oil conduit 144 to an inlet port 146 of the torque converter and a port 150c of the lock-up valve 108, the port 118e communicates via an oil conduit 148 with the lock-up clutch oil chamber 14 within the torque converter 12 and with a port 150b of the lock-up valve 108. For preventing the application of an excessive pressure to the interior of the torque converter 12, the oil conduit 144 is provided with an orifice 145. Applied to the spool 134 of the line pressure regulator valve 102 are two forces in the rightward direction, one by the spring 134 and the other by the line pressure acting on a differential area between the lands 132a and 132b, and two forces in the leftward direction, one by the spring 136 and the other by the pressure at the port 118e acting upon a differential area between the land 132d and 132e, and the spool 132 adjusts the amount of drainage of the oil at the ports 118c via the port 118d and 118b (firstly the oil is drained via the port 118d into the oil conduit 144, and if it cannot afford the adjustment, the oil is drained via the port 118b, too), thus regulating the line pressure to balance the forces in the leftward and rightward directions. Therefore, the line pressure increases as the throttle opening degree increases, as a reduction ratio increases, and as the pressure at the port 118e (viz., the oil pressure building up within the lock-up clutch oil chamber 14) increases. (In this case, the torque converter 12 is in non lock-up state because the oil pressure in the chamber 14 is high.) The adjustment of the line pressure in this manner meets the actual demands, viz., the oil pressure must be increased to increase a force with which the pulleys are urged against the V-belt 32 so as to increase the torque transmission capacity which increases with increase in friction because the output torque of the engine increases as the throttle opening degree increases and the multiplication of the torque increases as the reduction ratio increases and besides the oil pressure must be increased to increase the transmission torque to deal with the multiplication function of the torque by the torque converter 12 when it operates in a non lock-up state prior to lock-up.

The shift control valve 106 has a valve bore 122 formed with five ports 122a, 122b, 122c, 122d and 122e, and a spool 152 received in the valve bore 122 and formed with four lands 152a, 152b, 152c and 152d. The center port 122c communicates with the oil conduit 116 which is supplied with the line pressure, the left port 122b and right port 122d communicate via respective conduits 154 and 156 with the drive pulley cylinder chamber 28 of the drive pulley 24 and the driven pulley cylinder chamber 44 of the driven pulley 34. The port 122b communicates via an oil conduit 158 with a port 150d of the lock-up valve 108. Both of the end ports 122a and 122e are drained. The left end of the spool 152 is linked to a substantially middle portion of a lever 160 of the later-mentioned shift operating mechanism 112. The axial length of each of the lands 152b and 152c is slightly smaller than the width of the corresponding one of the ports 122b and 122d, whereas, the axial length between the lands 152b and 152c is substantially the same as the axial length between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. Conversely, urging the spool 152 to move rightwardly causes the reverse action to that mentioned above to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotational direction to cause the sleeve 162 to move leftwardly, the lever 160 moves in a clockwise rotational direction with its end portion received by the annular groove 30a of the axially movable conical disc 30 of the drive pulley 24 as a fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a reduction in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and driven pulley 34 to assume the state accomplishing a low reduction ratio. This action causes the spool 152 and the drive pulley 24 and driven pulley 34 to assume a state accomplishing a reduction ratio depending upon the amount of rotation of the shift motor 110. It goes the same if the shift motor 110 is rotated in the reverse direction. Therefore, if the shift motor 110 is actuated in accordance with a predetermined shift pattern, the reduction ratio varies accordingly, thus making it possible to control the shift in the continuously variable transmission by controlling the shift motor 110, alone.

The shift motor 110 is controlled by a control unit, not illustrated, which detects a revolution speed of the drive pulley 24 and a parameter indicative of the output torque of the engine, such as a throttle opening degree, wherein a desired value in engine revolution speed is determined using a predetermined function which defines for any value in the parameter indicative of the output torque of the engine a desired value in engine revolution speed. The control unit operates the shift motor to control the reduction ratio in such a manner as to maintain the revolution speed of the drive pulley in a predetermined relationship with the desired value in engine revolution speed. The control method and apparatus are described in co-pending U.S. application Ser. No. 362,489 (Japanese associate ref: 151-81) entitled "METHOD AND APPARATUS FOR CONTROLLING CONTINUOUSLY VARIABLE V-BELT TRANSMISSION," filed concurrently with the present application by the same inventors and commonly assigned herewith, the disclosure of which application is hereby incorporated by reference in its entirety.

The lock-up valve 108 comprises a valve bore 150 formed with four ports 150a, 150b, 150c and 150d, a spool 170 having two lands 170a and 170b, and a spring 172 biasing the spool 170 rightwardly. The port 150d communicates with a port 122b of the shift control valve 106 through an oil conduit 158, the ports 150b and 150c communicate respectively through oil conduits 148 and 144 with the port 118e of the line pressure regulator valve 102 and the port 118d thereof, and the port 150a is drained. The oil conduits 144 and 158 and a drain oil conduit extending from the port 150a are provided with orifices 174, 176 and 178, respectively. The same oil pressure as that applied to the torque converter inlet port 146 is applied to the port 150c via the oil conduit 144, but when the oil pressure applied to the port 150d via the oil conduit 158 (the same oil pressure as that within the drive pulley cylinder chamber 28) is high enough as to press the spool 170 to the left against the force of the spring 172, the port 150c is blocked by the land 170b and the port 150b is drained via the port 150a. Therefore, the lock-up clutch oil chamber 14 which communicates with the port 150b via the oil conduit 148 is drained, thus permitting the lock-up clutch 10 to assume an engaged state by the pressure within the torque converter 12, rendering the torque converter to operate in lock-up state wherein the torque converter has no function as a torque converter. Conversely, if the oil pressure at the port 150d decreases to cause a leftwardly directed force to become smaller than a rightwardly directed force due to the spring 172, spool 170 moves rightwardly to a position wherein the port 150b is allowed to communicate with the port 150c. This causes the oil conduit 148 to communicate with the oil conduit 144, allowing the same oil pressure as that applied to the torque converter inlet port 146 to reach the lock-up clutch oil chamber 14, allowing the pressures on the both sides of the lock-up clutch 10 to become equal to each other, resulting in the release of the lock-up clutch 10. The orifice 178 is provided to prevent rapid drainage of the oil pressure from the lock-up clutch oil chamber 14 so as to alleviate a shock upon shifting into lock-up state, whereas, the orifice 174 is provided in the oil conduit 144 to permit a gradual increase in oil pressure within the lock-up oil chamber 14 so as to alleviate a shock upon release of the lock-up state. An orifice 176 is provided in an oil conduit 158 to prevent the occurrence of a chattering in the lock-up valve 108 owing to small variations in oil pressure in the drive pulley cylinder chamber 28.

The torque converter outlet port 180 communicates with the oil conduit 182 which is provided with a relief valve 188 including a ball 184 and a spring 186 and thus, with this relief valve, the pressure within the torque converter 12 is maintained at a constant pressure. The oil downstream of the relief valve 188 is introduced by an oil conduit 190 to an oil cooler and a lubricant circuit, both being unillustrated, and is finally drained, whereas, an excessive oil is drained by another relief valve 192, the thus drained oil being returned finally to a tank 114.

Figure 7:
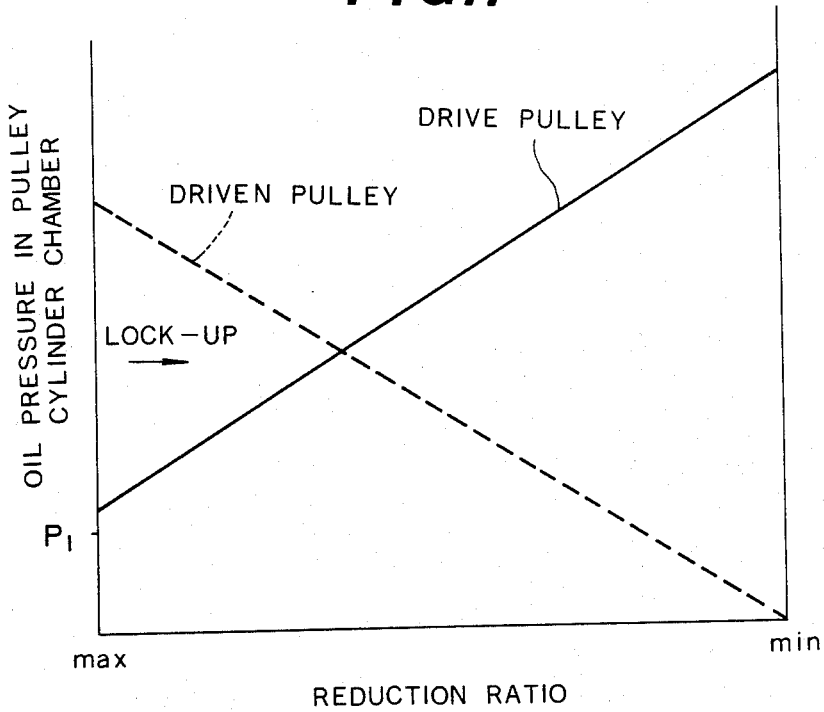
FIG. 7 is a similar graph to that shown in FIG. 5 illustrating the fluid pressure vs., reduction ratio relationship in the event the setting of bias spring of the switch valve is weak enough or in the event a spring is provided in the driven pulley as illustrated in FIG. 6.

As explained in the overall description of the hydraulic control system, according to the present invention, the lock-up valve 108 is provided as a switch valve which effects switching between the supply of a working fluid pressure (the same pressure as that at the inlet port 146 of the torque converter) to and the discharge thereof from the lock-up clutch oil chamber 14, wherein the same oil pressure as that in the drive pulley cylinder chamber 28 is supplied to the port 150 as a pilot oil pressure for controlling the switching action of the lock-up valve 108. In operation, when the oil pressure in the drive pulley cylinder chamber 28 is lower than a predetermined value (viz., when the reduction ratio is great), the same oil pressure as that in the torque converter 12 is supplied to the lock-up clutch oil chamber 14, thus releasing the lock-up clutch 10, allowing the torque converter 12 to perform its normal function. Conversely, when the oil pressure in the drive pulley cylinder chamber 28 is higher than the above-mentioned predetermined value (viz, when the reduction ratio is small), the oil pressure in the lock-up clutch chamber 14 is drained to engage the lock-up clutch 10 to lock the torque converter 12 in lock-up mode. That oil pressure at which the lock-up valve 108 switches its state has a relationship with the reduction ratio as diagrammatically illustrated in FIG. 5. As shown, the oil pressure in the drive pulley cylinder chamber 28 increases as the reduction ratio decreases in an inversely proportional manner as shown by the solid line, and the oil pressure in the driven pulley cylinder chamber 44 decreases as the reduction ratio decreases in a proportional manner as shown by the broken line. If the setting is made such that the lock-up valve 108 switches from one state to the other when the oil pressure reaches $P_1$, then the torque converter 12 operates in non lock-up state within a range wherein the reduction ratio is greater than $R_1$, while, within a range wherein the reduction ratio is smaller than $R_1$, the torque converter 12 operates in lock-up state. It will be understood that the reduction ratio $R_1$ may be set in a desired manner by selecting the load of the spring 172. For example, if the load of the spring 172 is set very small, the torque converter 12 can be locked immediately after the commencement of a shifting operation. The same effects may be obtained also by providing a spring 44b in the driven pulley cylinder chamber 44 as shown in FIG. 6 to provide an initial bias to axially movable conical disc 46, thus providing oil pressure vs., reduction ratio relationship as shown in FIG. 7 wherein the shift operation commences when the oil pressure in the drive pulley cylinder chamber 28 has increased to a value higher than $P_1$. (The other parts shown in FIG. 6 are the same as the corresponding parts shown in FIG. 4.) This arrangement, therefore, allows the torque converter 12 to be locked immediately after the commencement of shift operation.

Figure 1:
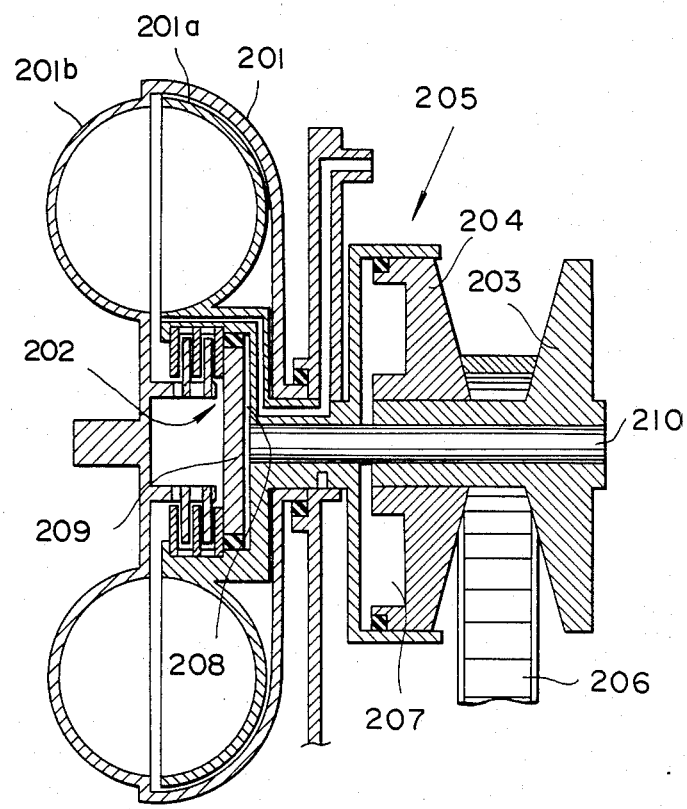
FIG. 1 is a diagrammatic view of the conventional continuously variable V-belt transmission.

It will now be understood from the description of the first and second embodiments of the present invention that since the variable oil pressure in the drive pulley cylinder chamber 28 does not act directly upon the lock-up clutch 10, the lock-up clutch 10 is now free from excessive wear which is caused in the case of the conventional transmission shown in FIG. 1. In the case of providing the spring 44b, it is ensured that a shift operation does not commence until the oil pressure in the drive pulley cylinder chamber 28 increases sufficiently high enough for urging the lock-up valve 108 to lock the torque converter 12.

Referring now to FIG. 8, the third embodiment is explained. The third embodiment is different from the first embodiment shown in FIG. 4 only in the provision of a converter detector valve 194. The converter detector valve 194 has a port 195b communicating via an oil conduit 148 with a port 118e of a line pressure regulator valve 102 and a port 150e of a lock-up valve 108. A port 195d of the converter detector valve 194 communicates via an orifice 193 with the port 195b. The same oil pressure supplied to the torque converter 12 is supplied to an inlet port 195c of the converter detector valve 194 via an oil conduit 144. Another minor difference is that the orifice 174 is not disposed in the third embodiment shown in FIG. 8.

Explaination is made hereinafter as to the converter hereinafter the converter.

The converter detector valve 194 is explained comprises a valve bore formed with four ports 195a, 195b, 195c and 195d, a corresponding spool 196 to the valve bore having two lands 196a and 196b, a spring 197 biasing the spool 196, leftwardly, and a slider 198 coaxially arranged to the spool 196 for slidable movement, and a return spring 199 biasing the slider 198 leftwardly, wherein the slider 198 is biased by a lever 9a rotatable in unitary with a reaction shift 9 which carrys the stator 8 within the torque converter 12 via a one-way clutch 8a. When a reaction force is applied to the stator 8 due to flow of oil within the torque converter 12 (viz., when the torque converter performs torque multiplication function), the reaction shaft 9 is urged to rotate in a counter clockwise direction in accordance with the magnituide of the reaction force. Provision is made to prevent the unnecessary rotation of the reaction shaft 9 by stops 11 and 13. The port 195a is a drain port, and the ports 195b and 195d are connected to the port 118e of the line pressure regulator valve 102 through the oil conduit 148 and to the port 150e of the lock-up valve 108, and the port 195c is connected to the port 118d of the line pressure regulator valve 102 through the oil conduit 144. The lands 196a and 196b of the spool 196 are such that when one of the lands begins to open the port 195a or 195c, the other land begins to close the other port 195c or 195a.

The converter detector valve 194 operates in the following manner. Under a condition when no force acts upon the reaction shaft 9 (viz., when the torque converter 12 does not perform the torque multiplication function), since no force is urged by lever 9a to the spool 196 via the slider 198, the spool 196 is urged leftwardly by the spring 197 to the position wherein the port 195c is closed by the land 196b and the port 195b is drained off to the port 195a. Accordingly, the oil conduit 148 is drained off, thus allowing no oil pressure to act upon the port 118e connected to this oil conduit which plays a role as a pressure increase pilot pressure of the line pressure regulator valve 102. This causes the line pressure to be regulated to a low level. Under a condition wherein the torque converter 12 performs the torque multiplication function, a reaction force acts on the stator 8, causing the reaction shaft 9 to rotate counter clockwise in accordance with the magnitude of the reaction force. (As is well known, since the torque converter multiplies torque by an amount corresponding to the magnitude of the reaction force on the stator, it follows that the more the multiplied torque, the more the stator reaction force increases in magnitude.) The rotation of the reaction shaft 9 is transmitted via the slider 198 to the spool 196, thus urging the spool 196 for rightward movement. This rightward movement of the spool 196 gradually opens the port 195c to which pressurized oil is supplied from the line pressure regulator valve 102 and closes the drain 195a, causing the oil pressure to build up in the port 195b. This oil pressure is fed to the port 195d to urge the spool 196 leftwardly so that the spool assumes that position at which the rightwardly directed force due to the slider 198 balances with a leftwardly directed force due to the above-mentioned oil pressure and a leftwardly directed force by the spring 197, causing a modulated oil pressure corresponding to this balanced state to build up at the port 195b. Therefore, the higher the stator reaction force, the higher the oil pressure at the port 195b becomes. This oil pressure is fed to the port 118e, via., a pilot port for an increase in oil pressure, of the line pressure regulator valve 102 through the oil conduit 148, causing the line pressure regulator valve 102 to increase the level of the line pressure. As the oil pressure at the port 195b increases, the line pressure increases, an increase in the line pressure in proportion to the magnitude of the stator reaction force results. It follows that as the torque converter 12 performs a torque multiplication function, the line pressure increases in response to that magnitude of torque which has been increased, thus providing the optimum magnitude of torque transmission capacity by the V-belt at all times. If the torque multiplication function by the torque converter 12 disappears, the line pressure drops as previously described, thus preventing the occurrence of unnecessarily high oil pressure. It goes without saying that the line pressure is controlled dependent upon the throttle opening degree irrespective of the state when the torque multiplication is effected or not, so that the line pressure is modulated always in response to the engine output.

The converter detector valve 194 delivers to the oil conduit 148 the oil pressure indicative of the stator reaction force, and the oil conduit 148 is connected to the port 150e of the lock-up valve 108. Therefore, as previously described, the lock-up valve 108 switches itself to actuate or deactuate the lock-up device in response to balance of a rightwardly directed force resulting from a force acting upon the land 170a by the oil pressure responsive to the stator reaction and the force of the spring 172 with a leftwardly directed force acting upon the land 170b due to the oil pressure fed to the port 150d from the drive pulley cylinder 28. Assume now that there exists no stator reaction force, since no oil pressure acts upon the port 150e of the lock-up valve 108, in the case wherein a leftwardly directed force acting upon the spool 170 of the lock-up valve 108 is smaller than a rightwardly directed force by the spring 170 because the oil pressure within the pulley cylinder chamber 28 is low (viz., because the reduction ratio is large), the lock-up valve 108 allows the same oil pressure as that within the torque converter 12 to be supplied to the lock-up clutch oil chamber 14 to release the lock-up clutch 10, thus permitting the torque converter 12 to operate in a usual state when it does not lock up. (The case wherein it performs the torque multiplication in this state will be later described). Conversely, in the case wherein the oil pressure within the drive pulley cylinder chamber 28 is high (viz., when the reduction ratio is small) and the leftward force acting upon the spool 170 is greater than the rightward force due to the spring 172, the oil pressure within the lock-up clutch oil chamber 14 is drained off the permit the engagement of the lock-up clutch 10, thus permitting the torque converter 12 to lock up. However, if the torque converter 12 performs the torque multiplication function to produce the stator reaction, the spool 170 is urged rightwardly even if the oil pressure within the drive pulley cylinder chamber 28 is relatiely high so as to release the lock-up. It may be designed such that the lock-up is released whenever the stator reaction begins to take place. Therefore, under an operating condition when the torque multiplication is performed, viz., a condition that usually requires a large torque, the torque converter will never lock up even if a shift takes place from a large reduction ratio to a small reduction ratio, thus allowing the torque converter 12 to exhibit its inherent function to provide a smooth acceleration under this condition. Furthermore, there occurs no shock inherent to a lock-up operation resulting from the actuation of the lock-up device during the torque multiplication function.

Figure 5:
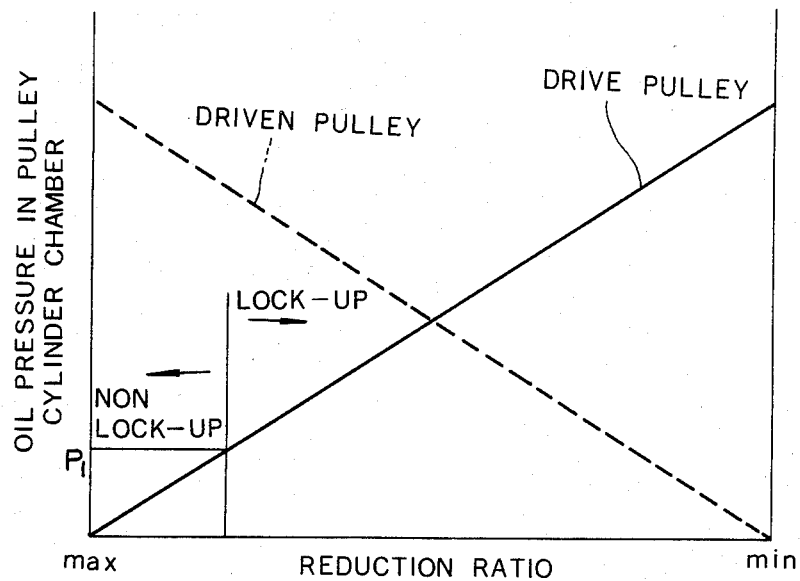
FIG. 5 is a graph showing how fluid pressure in each of cylinder chamber of drive and driven pulleys vary against the variation in reduction ratio.
Figure 6:
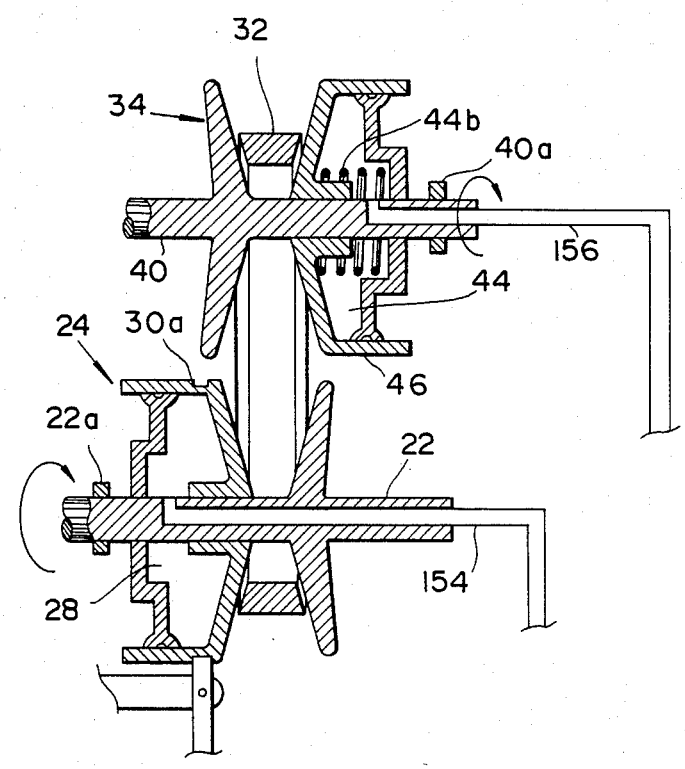
FIG. 6 is a fragmentary view of FIG. 4 illustrating a second embodiment.

Although, in the previous description, the stator reaction force has been translated by the converter detector valve 194 into the oil pressure and this oil pressure has been permitted to act upon the lock-up valve 108, it may provide substantially the same function and effect in switching operation of a lock-up valve 108 that a lever 9a is so arranged as to directly urge a spool 170 of the lock-up valve 108 as shown in FIG. 5 only if a suitable arrangement is made as to dispose the lock-up valve in relation to a reaction shaft 9 and the balance with the pilot force acting upon the lock-up valve 108 is made.

Figure 9:
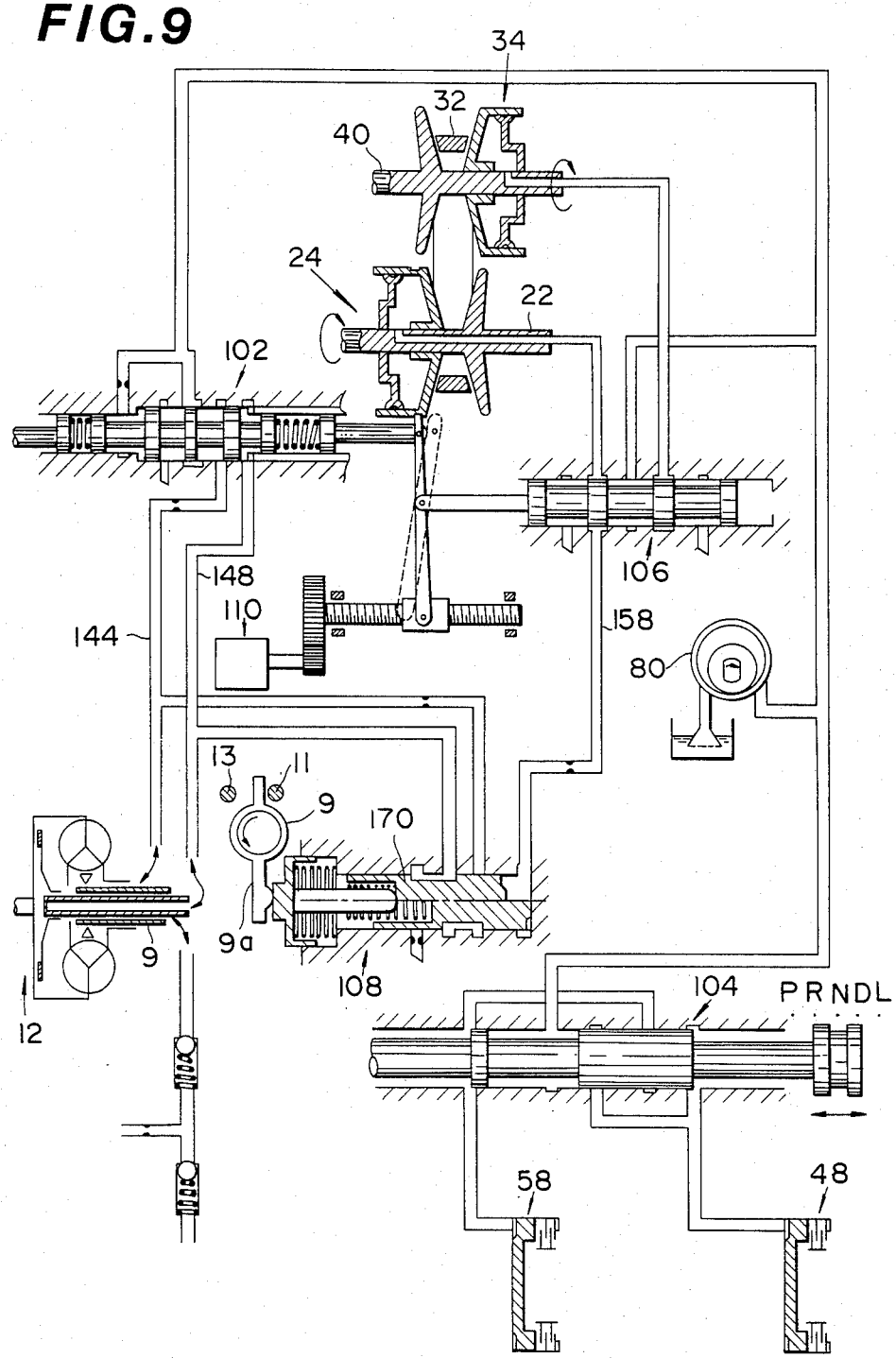
FIG. 9 illustrates a fourth embodiment.

As will now be understood from the third and fourth embodiments shown in FIG. 8 and 9, respectively, since the torque converter 12 will not lock up while it is performing torque multiplication function, such an event is prevented as that the lock-up takes place at an early stage upon moving-off of the vehicle from the rest or upon rapid acceleration.

What is claimed is:

1. A continuously variable V-belt transmission comprising:
   a continuously variable V-belt transmission unit having a drive shaft and a driven shaft;
   a hydrodynamic transmission unit having an input member and an output member drivingly connected to said drive shaft of said continuously variable V-belt transmission unit, said hydrodynamic transmission unit including a lock-up clutch having an engaged state wherein said input member is mechanically connected to said output member so as to place said hydrodynamic transmission unit in a lock-up mode, said lock-up clutch having a disengaged state wherein said input member is out of mechanical connection with said output member, said lock-up clutch including a lock-up chamber and being shiftable responsive to fluid pressure in said lock-up chamber to one of said engaged and disengaged states;
   said continuously variable V-belt transmission unit having a V-belt running over a drive and a driven pulley, each having a cylinder chamber and two conical discs, one conical disc of said drive pulley being secured to said drive shaft, one conical disc of said driven pulley being secured to said driven shaft, the other conical disc of said drive pulley being controllably movable in an axial direction of said drive shaft in response to fluid pressure in said cylinder chamber of said drive pulley, the other conical disc of said driven pulley being controllably movable in an axial direction of said driven shaft in response to fluid pressure in said cylinder chamber of said driven pulley;
   a switch valve including means defining a valve chamber communicating with said cylinder chamber of said drive pulley, a valve element and means, including a spring, for biasing said valve element toward said valve chamber, said valve element being movable responsive to fluid pressure within said cylinder chamber of said drive pulley between a first position wherein fluid pressure is discharged from said lock-up chamber and a second position wherein fluid pressure is supplied to said lock-up chamber.

2. A continuously variable V-belt transmission as claimed in claim 1, wherein said lock-up clutch assumes said engaged state thereof to lock the hydrodynamic transmission unit when said valve element assumes said first position thereof when the fluid pressure in said cylinder chamber of said drive pulley is higher than a predetermined value, and said lock-up clutch assumes said disengaged state thereof when said valve element assumes said second position thereof when the fluid pressure in said cylinder chamber of said drive pulley is lower than said predetermined value.

3. A continuously variable V-belt transmission as claimed in claim 2, including:
   pumping means for the fluid;
   pressure regulator valve means for regulating the fluid supplied by the pumping means; and
   shift valve means connected to the pressure regulator valve means, to receive the fluid pressure therefrom, for regulating fluid supply to and discharge from both of said cylinder chambers of said drive and driven pulleys.

4. A continuously variable V-belt transmission as claimed in claim 1, wherein the fluid pressure in said cylinder chamber of said drive pulley increases as the reduction ratio of said continuously varible V-belt transmission unit decreases.

5. A continuously variable V-belt transmission as claimed in claim 1, wherein the driven pulley has a spring mounted within said cylinder chamber thereof, said spring acting on said other conical disc of said driven pulley so as to bias same in a direction assisting the movement of said other conical disc of said driven pulley responsive to the fluid pressure in said cylinder chamber of said driven pulley.

6. A continuously variable V-belt transmission as claimed in claim 1, wherein the hydrodynamic transmission unit comprises a torque converter including a stator, and said biasing means comprises means responsive to reaction impressed on said stator for biasing said valve element toward said valve chamber thereof.

7. A continuously variable V-belt transmission as claimed in claim 6, wherein said means responsive to reaction impressed on said stator comprises a reaction shaft carrying the stator via a one-way clutch, a lever connected to said reaction shaft for rotation therewith, and a pressure regulator valve means for impressing fluid pressure to said valve element in a direction to bias said valve element toward said valve chamber in response to angular displacement of said lever.

8. A continuously variable V-belt transmission as claimed in claim 6, wherein said means responsive to reaction impressed on said stator comprises a reaction shaft carrying said stator via a one-way clutch and a lever connected to said reaction shaft and acting upon said valve element to bias said valve element toward said chamber in response to angular displacement of said lever.

9. A continuously variable V-belt transmission comprising:
   a drive shaft;
   a driven shaft;
   a torque converter with a lock-up clutch including a lock-up chamber and cooperating clutch elements which move toward each other and into a fully engaged position in response to a variation in fluid pressure within said lock-up chamber;
   a source of pressurized fluid;
   a drive pulley having a cylinder chamber and two conical discs, one conical disc of said driven pulley being secured to said drive shaft, the other conical disc of said drive pulley being controllably movable in an axial direction of said drive shaft in response to fluid pressure within said cylinder chamber of said drive pulley;
   a driven pulley;
   a V-belt running over said drive and driven pulleys;
   means for controlling fluid supply to and fluid discharge from said drive pulley;
   a switch valve including a valve chamber communicating with said cylinder chamber of said drive pulley, a valve element and means, including a spring, for biasing said valve element toward said valve chamber, said valve element being movable in response to the fluid pressure within said cylinder chamber of said drive shaft between a first position wherein said lock-up chamber is connected to a drain port and a second position wherein said lock-up chamber is connected to said source of pressurized fluid.

10. A continuously variable V-belt transmission as claimed in claim 9, wherein said torque converter includes a stator, and said biasing means includes a reaction shaft carrying said stator via a one-way clutch, a lever connected to said reaction shaft for rotation therewith and means responsive to angular displacement of said lever for biasing said valve element toward said valve chamber so as to let said valve element assume said second position, thereby releasing said lock-up clutch.

* * * * *